United States Patent

Aoki et al.

[11] Patent Number: 5,910,826
[45] Date of Patent: *Jun. 8, 1999

[54] REAR PROJECTION SCREEN AND METHOD OF PRODUCING SAME

[75] Inventors: Satoshi Aoki, Kadoma; Hiroshi Yamaguchi, Hirakata, both of Japan

[73] Assignee: Matsushita Electric Industrial Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/755,631

[22] Filed: Nov. 25, 1996

[30] Foreign Application Priority Data

Dec. 8, 1995 [JP] Japan .................................. 7-320174
May 13, 1996 [JP] Japan .................................. 8-117578

[51] Int. Cl.⁶ .................................................. H04N 5/74
[52] U.S. Cl. .......................... 348/781; 348/834; 348/832; 359/460; 445/23
[58] Field of Search .................... 348/787, 788, 348/789, 794, 832, 833, 834, 836–843; 359/450–460; 445/22, 23; H04N 5/74, 5/64

[56] References Cited

U.S. PATENT DOCUMENTS

| | | | |
|---|---|---|---|
| 3,418,426 | 12/1968 | Schlegel et al. | 358/832 |
| 4,804,883 | 2/1989 | Muller et al. | 313/478 |
| 4,921,330 | 5/1990 | Takahashi et al. | 353/71 |
| 4,992,881 | 2/1991 | Tomasek et al. | 348/834 |
| 5,404,073 | 4/1995 | Tong et al. | 313/479 |
| 5,629,745 | 5/1997 | Naito et al. | 348/836 |

FOREIGN PATENT DOCUMENTS 4-70645  6/1992  Japan .

Primary Examiner—Michael Lee
Attorney, Agent, or Firm—Parkhurst & Wendel

[57] ABSTRACT

The present invention relates to a rear projection screen used in projection type television sets and the like. A rear projection screen according to the present invention is characterized in that a mask for prevention of penetration of light is formed on the main surface on one of the inner and outer sides of a bottomed box-shaped container and a screen which directs projected light in a predetermined direction is disposed on the inner side of this box-shaped container. The method of producing a rear projection screen according to the invention is capable of efficiently producing the box-shaped container having a mask formed thereon.

9 Claims, 6 Drawing Sheets

REAR PROJECTION SCREEN AND METHOD OF PRODUCING SAME

FIELD OF THE INVENTION

The present invention relates to a rear projection screen (International Patent Classification H04N 5/74) used in projection type television sets which enlarge and project images through lenses.

BACKGROUND OF THE INVENTION

A common rear projection screen of this type is constructed in the manner disclosed in Japanese Laid-open Utility Model Application 4-70645. This is constructed as shown in FIG. 6 by fixing a screen 101 comprising two kinds of lens sheets of Fresnel lens and lenticular lens to a frame body 102 having an opening in its display portion by a metal fixture 103 and setscrews 104.

DISCLOSURE OF THE INVENTION

With such conventional arrangement, the frame body 102 is usually formed by injection molding and hence coating is required as post-processing. In this case, in order to provide high grade appearance, there has been employed overcoating using a transparent paint to be applied to the ordinary coating. Therefore, this process offers problems of trouble and cost.

A rear projection screen according to the present invention comprises a bottomed box-shaped container, the main surface of one of the inner and outer sides being formed with a mask to prevent penetration of light, the inner side of said box-shaped container having a screen received therein. And a rear projection screen which arouses a feeling of transparency and which is elegant can be manufactured easily and at low cost. Particularly, if a mask for prevention of penetration of light is formed around the outer periphery of the inner surface of the box-shaped container, it is rendered more resistant to being damaged from the outside.

Further, the method of producing a rear projection screen comprises the steps of covering a flat plate having a mask formed thereon in advance with a heat shielding plate which extends beyond the edge of said mask-formed portion by at least 1 mm, fitting said flat plate, while heating the latter, in a forming frame to thereby form a bottomed box-shaped rear projection screen. According to this arrangement, even if a rear projection screen in the form of a bottomed box-shaped container is formed by fitting it in a forming frame after it is heated, there will be no deformation taking place in the mask since the latter has not been heated; thus, a truly linear mask can be formed.

Further, the viewer-associated front side and the rear side of said rear projection screen are formed with an antistatic layer and an antireflection layer, whereby a rear projection screen which hardly catches dust particles and which little suffers from the nuisance projection of reflected image.

Such production method is characterized in that a masking is applied to the screen except its light penetration area.

With this arrangement, in the case where a liquid antistatic agent or a liquid antireflection agent is applied by dipping, the required portion alone can be formed with a uniform film by removing the unevenness due to non-uniform film thickness together with the masking.

Figure 5:
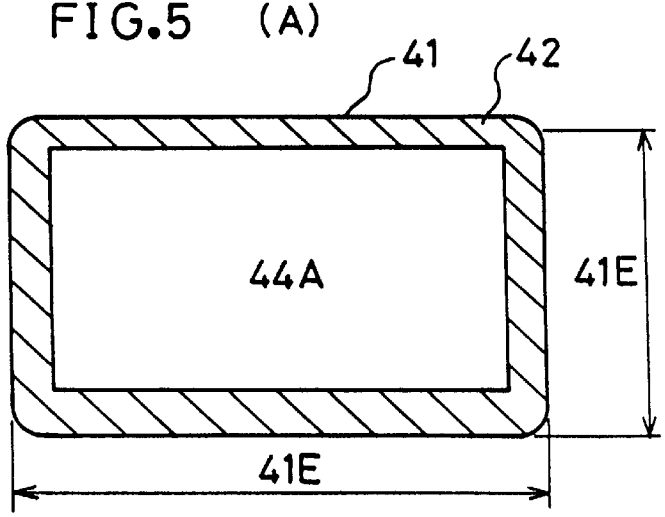
Figure 5:
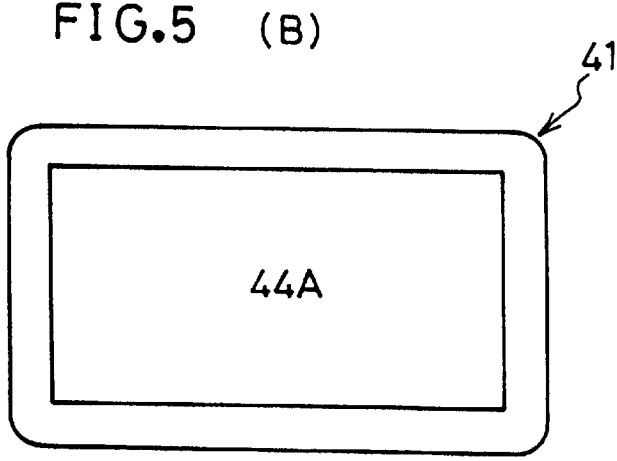
Figure 5:
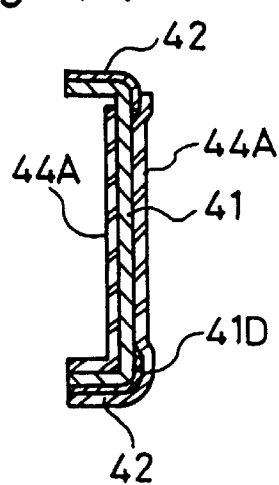
Figure 5:
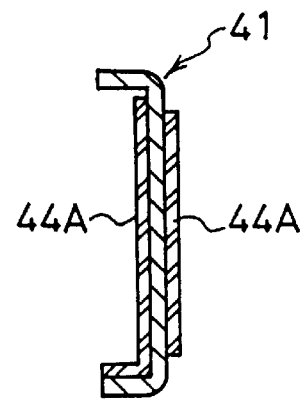

(A) of FIG. 5 is a front view of a rear projection screen after completion of the surface treatment in the third embodiment of the invention;

(B) of FIG. 5 is a front view of a rear projection screen after removal of a masking tape in the third embodiment of the invention;

(C) of FIG. 5 is a sectional view of FIG. 5 (A);

(D) of FIG. 5 is a sectional view of FIG. 5 (B); and

Figure 6:
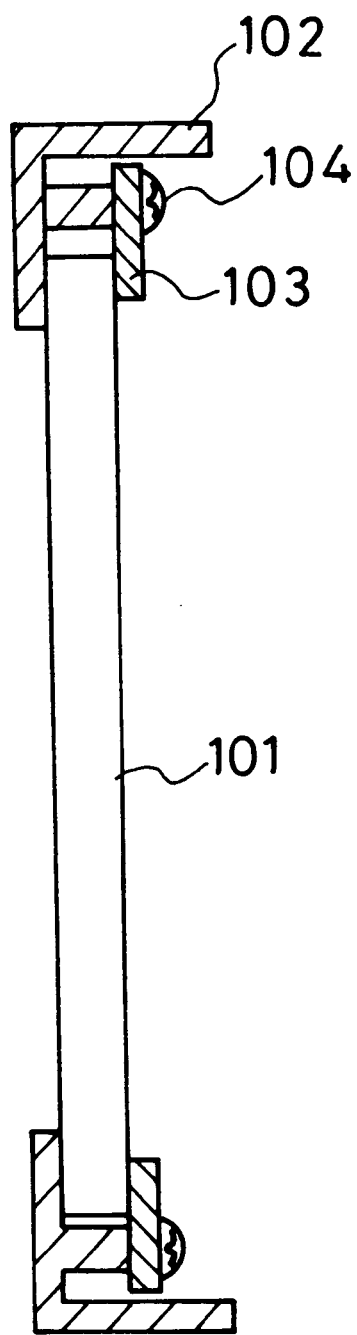

FIG. 6 is a sectional view of a conventional rear projection screens

DESCRIPTION OF EMBODIMENTS

Embodiments of the invention will now be described with reference to FIGS. 1 through 5.

(First Embodiment)

Figure 1:
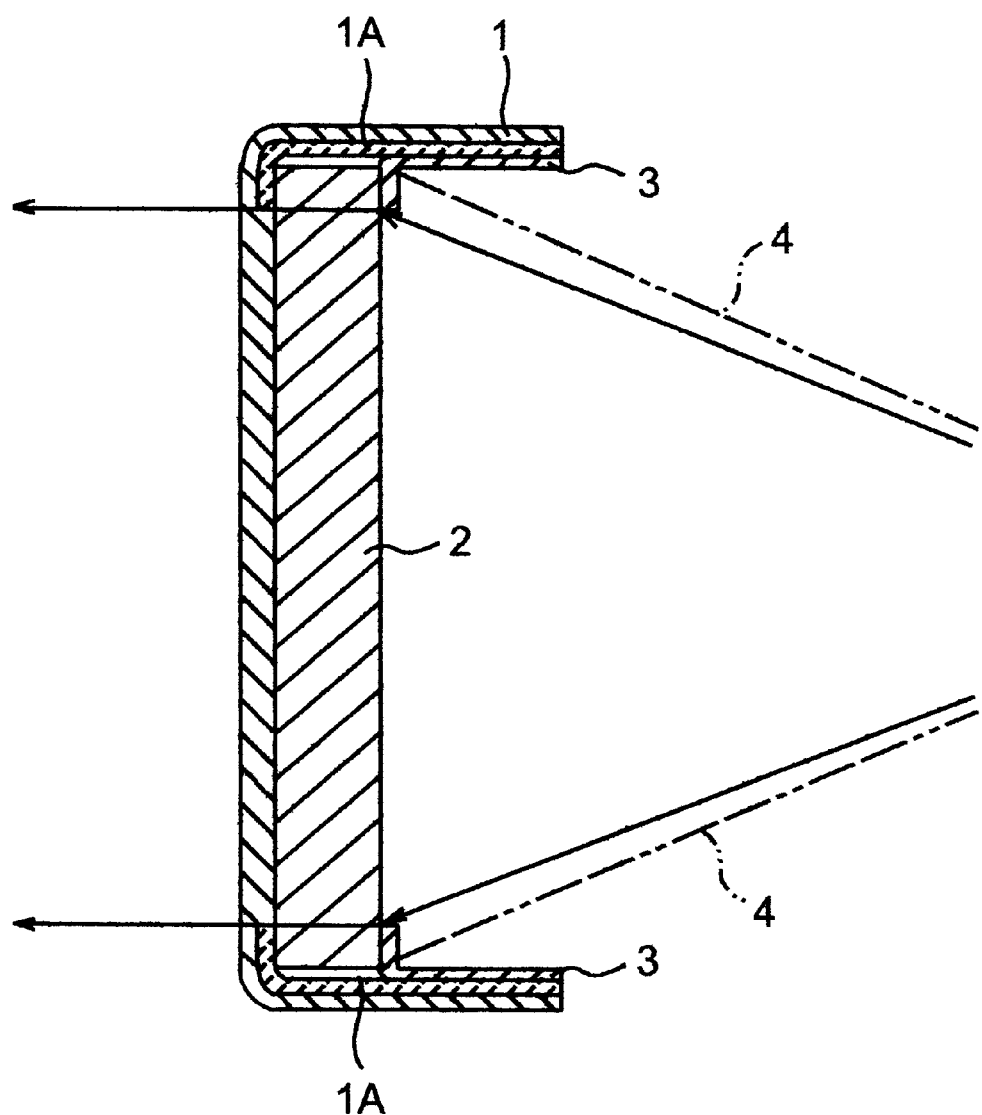
FIG. 1 is a sectional view of a rear projection screen in a first embodiment of the invention.

FIG. 1 shows a rear projection screen according to the invention.

The numeral 1 denotes a bottomed box-shaped container; 2 denotes a screen which directs projected light in a predetermined direction; and 3 denotes a member for attaching the screen 2 to the interior of the box-shaped container 1. In assembling operation, the screen 2 is received in the bottomed box-shaped container 1 and attached thereto by the attaching member 3 so that it will not come off the box-shaped container 1. A masks 1A which prevents penetration of light is formed around the outer periphery of the inner surface of the box-shaped container 1 in order to shut off the view of the unnecessary portion of the projected light 4 and the attaching member 3.

As for the method of forming the mask 1A, mention may be made of coating and printing. In the case of printing, it is necessary to apply printing before a blank is formed into the bottomed box-shaped container, and when printing is effected on this blank, it is necessary that a deformed print be made such that the resulting mask is straight when the bottomed box-shaped container which is in the final shape is obtained.

In the case of coating, it is not necessary to apply coating in advance of the forming; it may be applied after the forming. Further, such mask is not limited in position of application to the inner side and may be applied to the outer surface.

Figure 2:
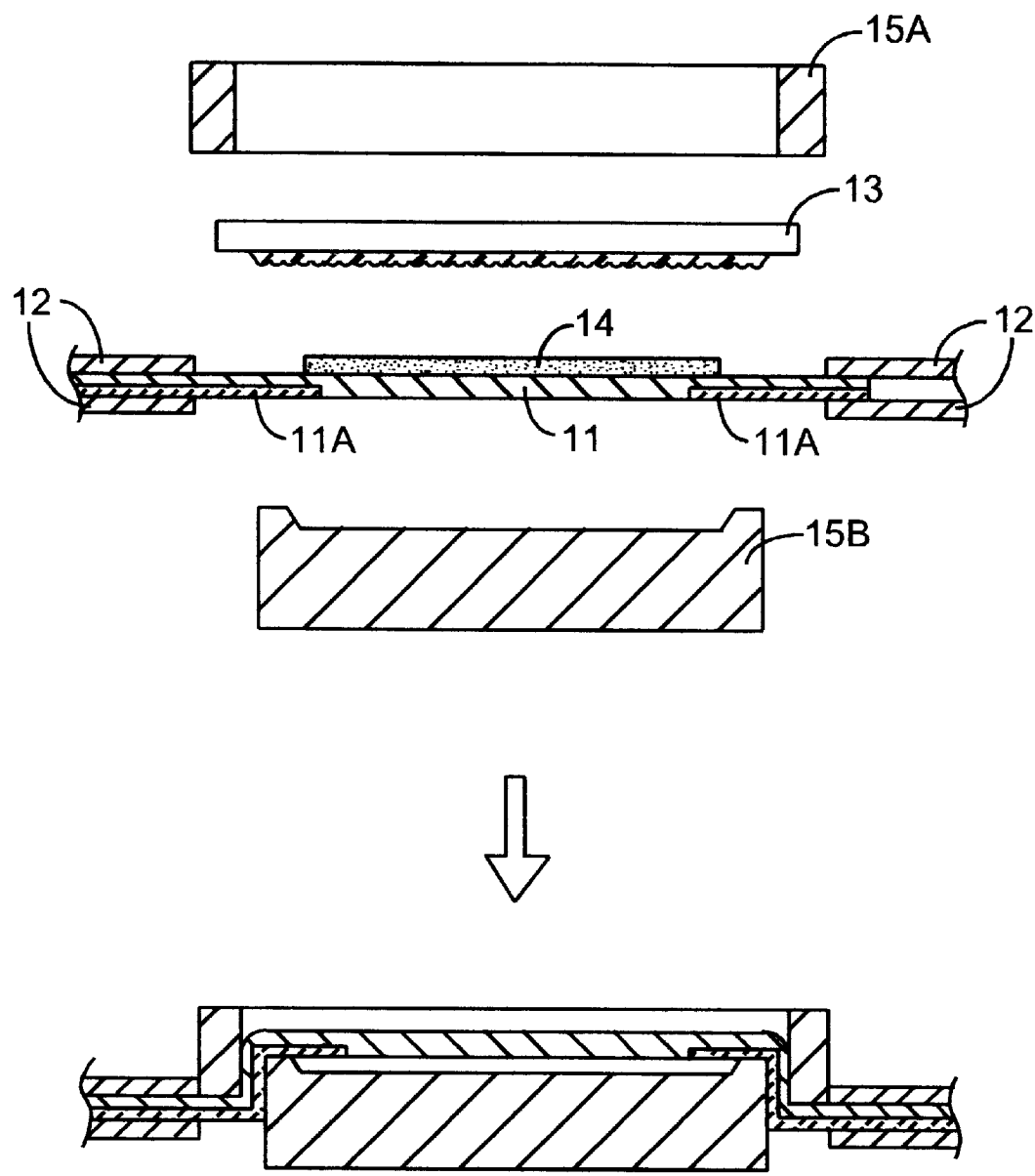
FIG. 2 is a principal sectional view showing a method of producing a rear projection screen in the first embodiment of the invention, and also showing the forming process.

The box-shaped container 1 with the mask 1A is produced in the process shown in FIG. 2.

In FIG. 2, the numeral 11 denotes a flat plate; 12 denotes a clamp for fixing the flat plate 11; 13 denotes a heater; 14 denotes a heat shielding plate; 15A denotes a forming frame; and 15B denotes a press form.

As for the forming method, the flat plate 11 having the mask 11A formed thereon in advance as by printing is fixed by the clamp 12 and heat shielding plate 14 is placed on the flat plate 11. In addition, the size of the heat shielding plate 14 is such that it extends beyond, by at least 1 mm, the edge of the mask 11A formed on the flat plate 11.

The heater 13 heats the assembly until the flat plate 11 except its shielded portion reaches a temperature at which the flat plate is rendered deformable, e.g., 130o or above for an acrylic plate. After it has reached the predetermined temperature, the heat shielding plate 14 is removed and the flat plate is held between the forming frame 15A and the press form 15B, whereupon the press form 15B is advanced to press the flat plate 11 to provide the predetermined bottomed box-shaped container.

In addition, since the edge of said mask is heat-shielded, it does not reach the deformation temperature. Therefore, even if the blank is held between the forming frame 15A and the press form 15B and subjected to forming, there is no danger of the edge of the mask being deformed; thus, the linearity of the edge of the mask is retained even after the forming.

(Second Embodiment)

Figure 3:
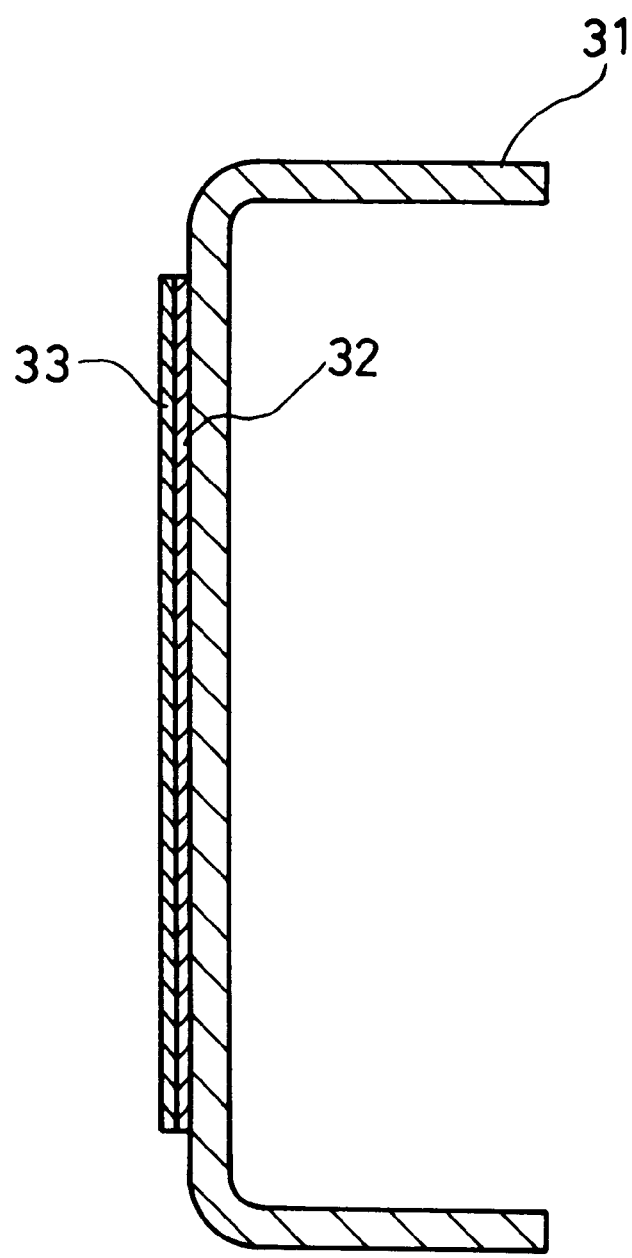
FIG. 3 is a sectional view of a rear projection screen in a second embodiment of the invention.

FIG. 3 shows a box-shaped container 1 used for the rear projection screen of the second embodiment.

This bottomed box-shaped container 31 is produced in the same way as the box-shaped container 1 of the first embodiment. The numeral 32 denotes an antistatic layer and 33 denotes an antireflection layer.

An example of the material for forming the antistatic layer is a metallic compound, typified by tin oxide, whose surface resistance is desirably less than $10^{11}$ Ω. The material for forming the antireflection layer 33 is, for example, fluoride resin, and the film thickness is desirably about 0.1 $\mu$m which is ¼ of the wavelength of ambient light (having a wavelength of 550 nm) which forms a cause of the nuisance projection.

These surface treatments make the surface hardly capable of catching dust particles and reduce the nuisance projection of reflected light. Further, in FIG. 3, the antistatic layer 32 and antireflection layer 33 have been formed on the outer side of the box-shaped container 31; however, the antistatic layer 32 and antireflection layer 33 may be formed on the inner side of the box-shaped container 31 or on both the inner and outer sides of the box-shaped container 31.

(Third Embodiment)

Figure 4:
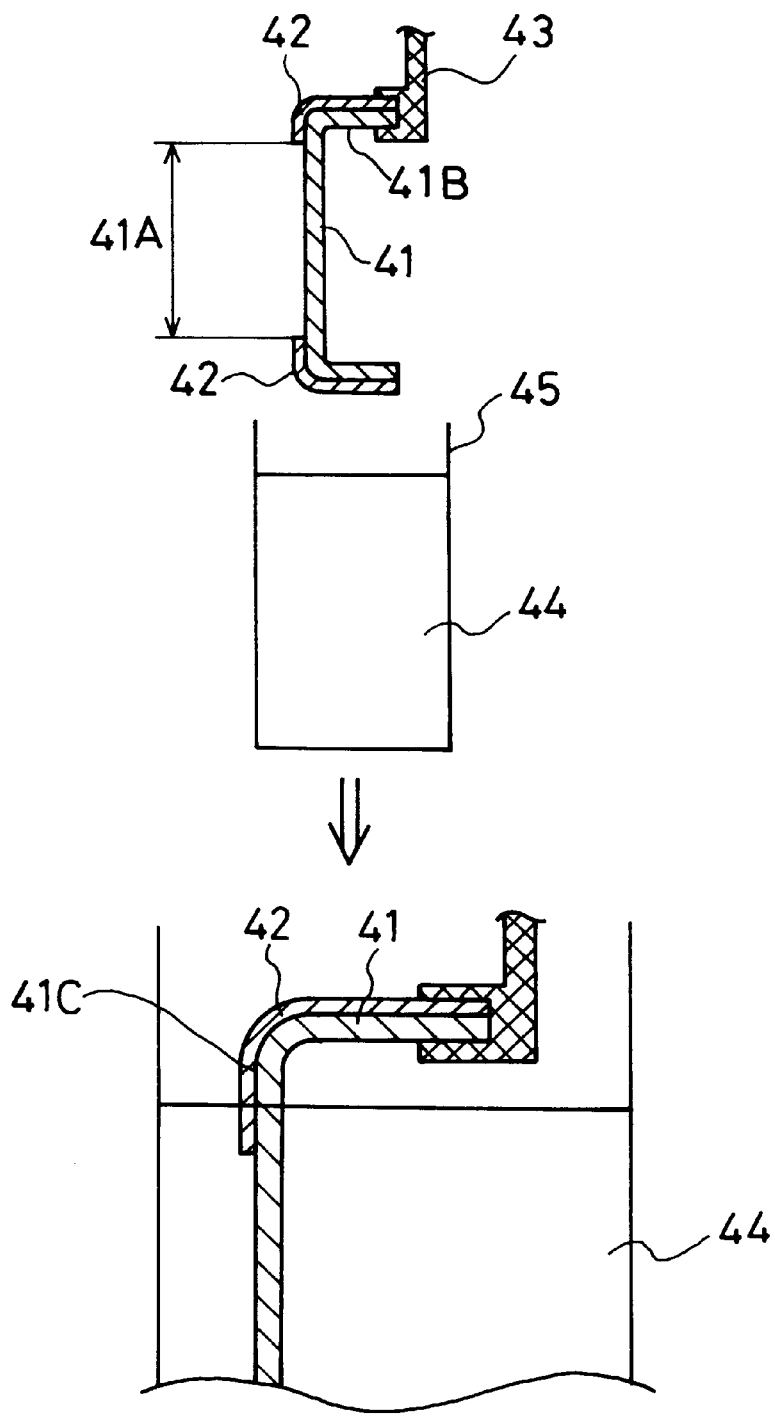
FIG. 4 is a principal sectional view showing a surface treating and forming process for a rear projection screen in a third embodiment of the invention.

FIGS. 4 and 5 show the third embodiment.

The third embodiment shows the process for forming the antistatic layer 32 and antireflection layer 33 on a box-shaped container which has a mask 1A applied thereto as in the first embodiment.

In FIG. 4, the numeral 41 denotes a bottomed box-shaped container which has already been formed with a mask 1A (not shown). The numeral 42 denotes a masking tape; 43 denotes a lifting device; 44 denotes an antistatic or antireflection material; and 45 denotes a tank for storing the antistatic or antireflection material 44.

First, the masking tape 42 is applied to the box-shaped container 41 except its light penetration area 41A and the upper portion 41B of this rear projection screen 41 is fixed to the lifting device 43. And the screen is immersed in the antistatic or antireflection material 44 in the tank 45. At this time, it is arranged that the liquid surface of the antistatic or antireflection material 44 comes somewhat below the upper rounded corner portion 41C of the rim of the box-shaped container 41.

After the screen has been immersed in the antistatic or antireflection material 44, it is lifted at such a speed that the film thickness has a predetermined value.

Thereby, a film 44A of the antistatic or antireflection material 44 is formed on the area 41E shown in FIG. 5 (A). At this time, such film 44A is also formed on the inner side of the box-shaped container 41 as shown in FIG. 5 (C).

The region of the box-shaped container 41 below the lower rounded corner portion 41D of the rim of the box-shaped container 41 is formed with a film which is thicker than is required and which is non-uniform. As a result of removal of the masking tape 42 from the rear projection screen 41 after the surface treatment, the films 44A of required thickness of the antistatic or antireflection material 44 remain only on the required areas shown in FIG. 5 (B).

In addition, the film 44A on the inner side of the box-shaped container 41 is also non-uniform in the lower region, but such non-uniform portion of the film offers no problem since it is hindered by the mask 1A from being seen by the viewer.

What is claimed is:

1. A rear projection screen system comprising:
    a flat plate constructed of light penetrable material, said flat plate having a periphery portion and an inner portion;
    a mask placed on the periphery portion of a rear side of said flat plate, by one of printing, coating, or etching, said mask being opaque;
    a bottomed box-shaped container formed by bending said flat plate into a box with the rear side of said flat plate being an interior surface of said bottomed box-shaped container, and a front side of said flat plate being an exterior surface of said bottom box-shaped container so that a display screen is received within, and said mask blocking a periphery of said display screen; and
    said mask is skewed on said flat plate to compensate for bending said flat plate into a bottomed box-shaped container so that said mask is linear after said bottom box-shaped container is formed.

2. The rear projection screen system of claim 1 further comprising:
    an anti-static layer provided on said flat plate and an anti-reflection layer provided on at least one of the rear side and the front side of said flat plate.

3. The rear projection screen system of claim 1 further comprising:
    an anti-static layer provided on said flat plate and an anti-reflection layer provided on the inner portion of at least one of the rear side and the front side of said flat plate.

4. A method of producing an improved rear projection screen system comprising the steps of:
    coating at least one side of a light-penetrable flat plate with a mask on a periphery of the flat plate;
    covering an inner portion of the flat plate with a heat shielding plate extending onto a portion of the mask bordering the inner portion of the flat plate;
    heating the flat plate to a temperature at which the flat plate becomes bendable; and
    bending the flat plate by using a forming frame and a press form so that the flat plate is bent into a bottomed box-shaped container to receive a display screen, the inner portion of the flat plate and the portion of the mask covered by the heat shielding plate being linear, and the mask being on an interior surface of said bottomed box-shaped container.

5. The method according to claim 4 further comprising:
    forming an anti-static layer and an anti-reflection layer on at least one of a front and a rear side of the flat plate.

6. The method according to claim 4 further comprising:
    forming an anti-static layer and an anti-reflection layer on the inner portion of at least one of a front side and a rear side of the flat plate.

7. A method of producing a rear projection screen system comprising the steps of:

printing a skewed mask on a light penetrable flat plate;

heating the flat plate to a temperature at which it becomes bendable; and bending the flat plate into a bottom box-shaped container to receive a display screen so that the skewed printing of the mask on the flat plate compensates for the bending of said flat plate into a bottomed box-shaped container.

8. The method according to claim 7 further comprising:

forming an anti-static layer and an anti-reflection layer on at least one of a front side and a rear side of the flat plate.

9. The method according to claim 7 further comprising:

forming an anti-static layer and an anti-reflection layer on the inner portion of at least one of a front side and a rear side of said flat plate.

* * * * *